United States Patent [19]

Martin

[11] 4,216,940

[45] Aug. 12, 1980

[54] DIRECTIONAL TREE FALLING AID AND METHOD OF APPLYING SAME

[76] Inventor: Kenneth E. Martin, P.O. Box 34, Skamokawa, Wash. 98647

[21] Appl. No.: 32,896

[22] Filed: Apr. 24, 1979

[51] Int. Cl.³ ............................................. B66C 23/60
[52] U.S. Cl. ...................................... 254/390; 414/23; 144/34 R
[58] Field of Search ....................... 254/139, 139.1, 93, 254/100, 133; 212/60–65, 92, 144, 145; 414/23; 144/34 R, 34 B

[56] References Cited

U.S. PATENT DOCUMENTS

| | | | |
|---|---|---|---|
| 1,470,377 | 10/1923 | Kimberling | 414/23 |
| 1,512,181 | 10/1924 | Knechtel | 254/92 |
| 1,574,147 | 2/1926 | Franklin | 414/23 |
| 2,493,150 | 1/1950 | Kroger | 254/139.1 |
| 2,583,945 | 1/1952 | Jacobs | 254/133 |
| 2,707,615 | 5/1955 | Green | 254/100 |
| 3,014,696 | 12/1961 | Trott | 254/93 |
| 3,219,075 | 11/1965 | Roberts et al. | 144/34 R |

FOREIGN PATENT DOCUMENTS 695239 8/1940 Fed. Rep. of Germany .
285399 9/1952 Switzerland .

*Primary Examiner*—Leonard D. Christian
*Attorney, Agent, or Firm*—Eugene D. Farley

[57] ABSTRACT

A directional tree falling aid comprises a logging choker and a choker-elevating pole assembly designed to set the choker about the tree trunk at an elevated location. Pulling on the elevated choker while falling the tree makes possible falling the tree in the desired direction.

7 Claims, 8 Drawing Figures

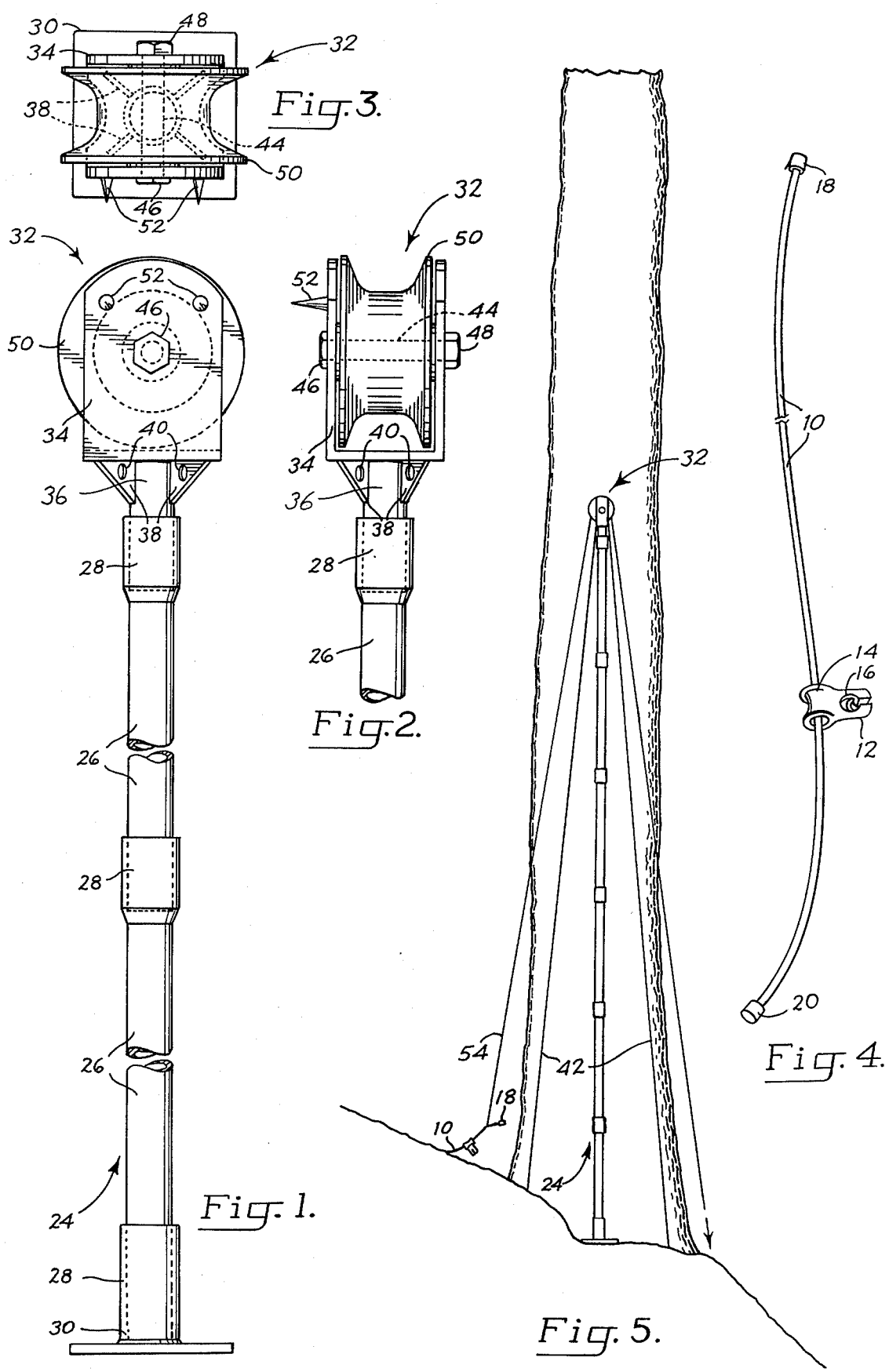

DIRECTIONAL TREE FALLING AID AND METHOD OF APPLYING SAME

BACKGROUND AND GENERAL STATEMENT OF THE INVENTION

This invention relates to a tree falling aid and to a method of applying the same.

In the logging industry, the directional falling of trees is of ever increasing importance. Logging sites frequently are littered with stumps, rocks, and previously felled or windblown timber. It is important that the trees to be felled at such sites do not strike against such obstructions as they fall. If they do, they may be severely broken up and shattered with resultant heavy economic loss.

A particular problem is presented when logging on steeply sloping terrain. In such locations the trees almost invariably lean outwardly. Also, the majority of the branches usually grow on the downhill side. Consequently when the tree is cut, it wants to fall downhill. If this occurs, the likelihood of shattered timber obviously is greatly increased. It is the primary object of modern logging practice to fall such trees uphill.

It is the primary object of the present invention to provide apparatus and method for achieving this purpose.

It is another object of this invention to provide a directional tree falling aid and method which are effective, simple, quick and easy to use, economical, safe, and applicable in a wide variety of difficult situations.

Still other important objects of my invention are the provision of a directional tree falling aid and method which are easy to use on steep slopes and in heavy brush, and which do not require the expensive assistance of a high climber.

The foregoing and other objects of my invention are accomplished by the use of a directional tree falling aid which, broadly considered, comprises a logging choker including a flexible cable and a coupler slidably mounted intermediate the ends of the cable. First connecting means are present on one end of the cable for connecting said one end of the coupler in cable-looping arrangement around a tree to be felled. Second connecting means are present on the other end of the cable for connecting it to a logging pulling line.

Used with the choker is a choker-elevating pole assembly comprising a pole adapted to be positioned vertically alongside the tree with its upper end in close proximity to the tree trunk. A substantially vertically arranged sheave is fixed to the pole upper end. It is dimensioned to receive the cable in running engagement.

In the use of the tree falling aid, a pilot line is passed over the sheave with which the end of the pole is provided. The pole with pilot line attached is elevated and located with its sheave end in close proximity to an elevated portion of the tree trunk, with the ends of the pilot line trailing near the ground.

At ground level one of the trailing ends of the pilot line is releasably tied to one end of the logging choker.

The pilot line then is pulled to mount the choker on the sheave with its ends trailing near the ground. At ground level the choker level then is looped about the tree and coupled. Also at ground level, the choker line is connected to a winch-connected logging pulling line.

Thereafter the latter line is pulled in, whereupon the choker rises to the elevation of the pole-mounted sheave and cinches up about the tree trunk, i.e. "is set". Tension then is applied to the pulling line, and choker, to apply a directional force to the tree as it is cut through, thereby controlling its direction of falling.

DESCRIPTION OF A SPECIFIC EMBODIMENT OF THE INVENTION

My invention is described herein with particular reference to the accompanying drawings, wherein:

FIG. 1 is a foreshortened view in side elevation of the hereindescribed directional tree falling aid. FIG. 2 is a fragmentary view in front elevation thereof.

FIG. 3 is a plan view thereof.

FIG. 4 is a foreshortened plan view of a logging choker line used as another key component of the hereindescribed directional tree falling aid, and FIGS. 5, 6, 7 and 8 are views in elevation of a tree to be felled, with the directional tree falling aid of my invention applied against the trunk of the tree, and illustrating the sequential stages of application of the aid in falling the tree.

Figure 8:
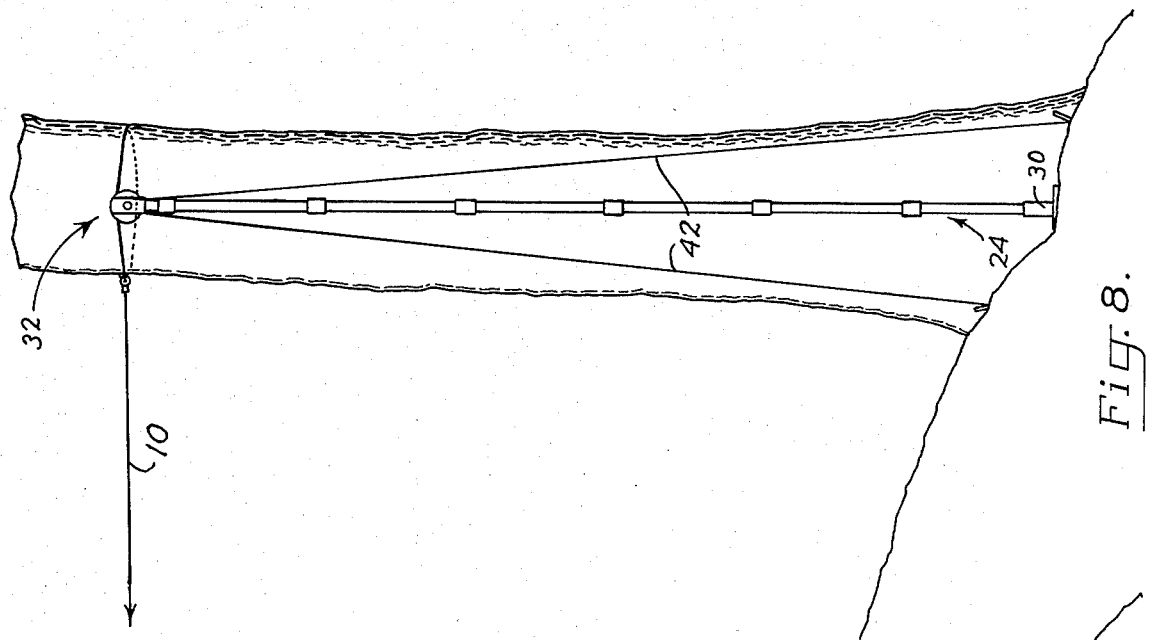

As noted above, the directional tree falling aid of my invention broadly comprises in combination a logging choker and a choker-elevated pole assembly for positioning and setting the choker about the trunk of the tree, at an elevation high above the ground.

The conventional choker illustrated in FIG. 4 comprises a long (60 feet or more) flexible cable 10 having slidably mounted between its end a coupler or "bell" 12. The bell comprises a sleeve 14, by means of which the unit is slidably mounted on the cable, and a socket 16.

The choker also is provided at one of its ends with a first connector or ferrule 18 designed and proportioned to seat releasably in socket 16 of bell 12.

At its other end the choker is provided with a second connector or ferrule 20. This is designed and proportioned for connection to the logging pulling line 22, which may be a drum line off a tractor towing winch or a mainline from a yarding machine.

In the ordinary application of the choker it is circled around a log segment, the first connector inserted in the socket of the bell, and the second connector connected to the pulling line. Upon reeling in the latter, the choker is cinched down on the log, thereby "setting" it. Continued reeling in of the pulling line then "yards" the log to a central log loading station.

In the practice of my invention, the choker is employed to apply directional force to a standing tree so that it will fall in a predetermined direction, e.g. in an uphill direction. This is accomplished by circling the tree with the choker 30 or 35 feet from the ground, setting the choker, and applying a directional pulling force on the choker with the pulling line while the saw cut is being made. As a result, the tree will fall in the direction of the pulling force.

To circle the tree with the choker at such an elevated location I make use of a choker-elevating pole assembly the construction of which is shown in FIGS. 1–3.

The pole assembly is indicated generally by the numeral 24. It is comprised of a number of segments 26 the aggregate length of which may be 30 to 35 feet, or even more. Each segment has a socket 28 on one end dimensioned to receive the butt end of a companion segment.

A foot or pedestal 30 receives the butt end of the lowermost segment.

A sheave assembly indicated generally at 32 is received in the socket of the uppermost segment.

The sheave assembly comprises a U-shaped bracket 34 to the bottom of which is welded a rod segment 36 by which the sheave assembly is mounted on the supporting pole.

Gussets 38 stiffen and support the bracket. Each gusset has an opening 40 for attachment of a guy line 42 (FIG. 5).

Bracket 34 mounts a shaft 44 with head 46 and a threaded end mounting a retaining nut 48. The shaft, in turn, rotatably mounts a pulley 50 having a flat profile for ready release of an engaging choker.

Spurs 52 extending horizontally from a side face of bracket 34 provide means for engaging the sheave assembly with the tree.

OPERATION

The operation of my directional tree falling aid is illustrated in sequential steps in FIGS. 5-8 inclusive.

First, sheave assembly 32 is inserted in the socket component of one of pole segments 26. A pilot line 54, which may be a one-half inch rope, is arranged centrally over pulley 50. The resulting assembly then is raised vertically and other pole segments 26 connected until a pole of the desired length has been assembled.

The upper end of the pole bearing the sheave is engaged with the tree trunk by means of spurs 52. The pole is stabilized by guy lines 42, hand held or staked. This preliminary position of the assembly is shown in FIG. 5. It will be noted that the trailing ends of pass line 54 are at substantially ground level.

One of the trailing ends then is attached to an end of choker line 10. This is accomplished simply by tying the end of the pilot line to the choker with a knot which can be easily untied.

Figure 6:
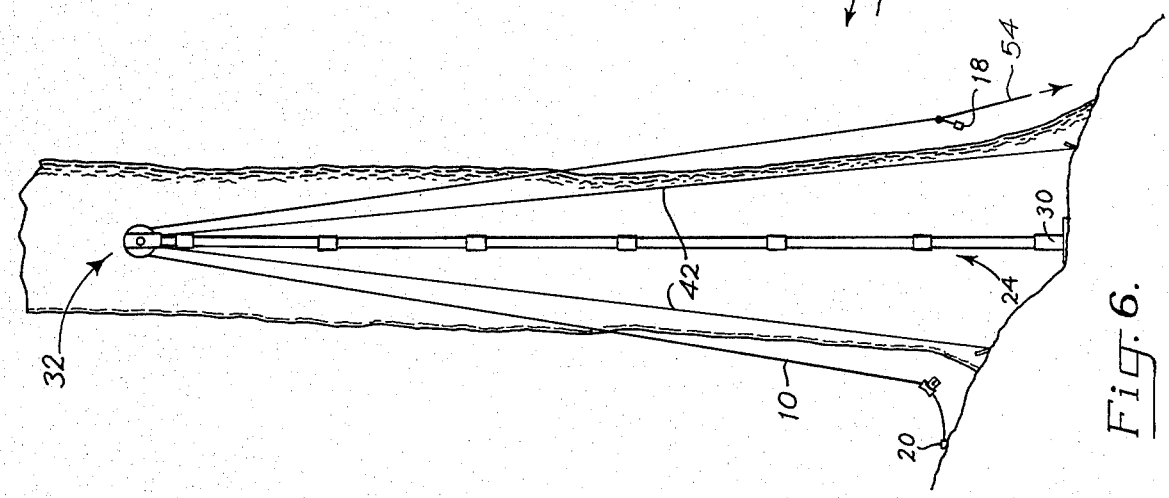

Next, the other end of the pilot line is pulled to mount the choker on the sheave, with its ends trailing, as shown in FIG. 6. During this operation bell 12 slides freely on the cable to its FIG. 6 position.

Figure 7:
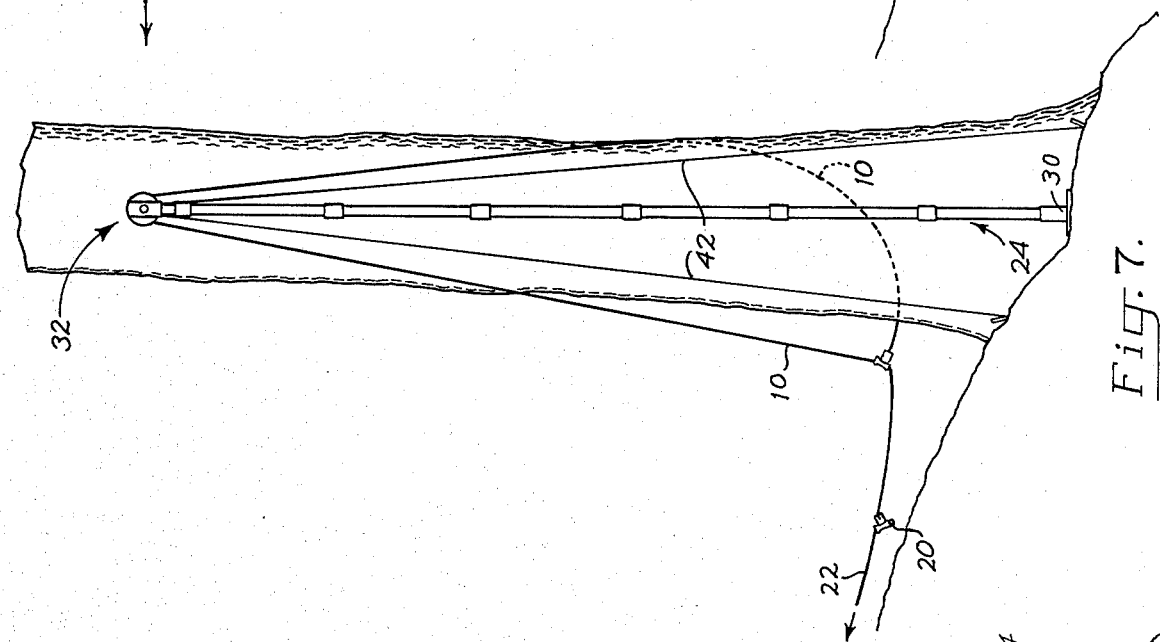

Next the pilot line with its connected end of the choker is walked or passed about the tree trunk and ferrule 18 inserted in socket 16 of bell 12, as shown in FIG. 7. Also, ferrule 30 is connected to the pulling line using ferrule 20. This may be accomplished employing an intermediate endwise arranged choker if desired.

Next the pilot line is untied from the choker and the pulling line tightened up. As shown in FIG. 8, this action is accompanied by sliding of the choker bights upwardly along the tree trunk and cinching down or setting of the choker about the tree trunk at substantially the elevation of sheave 32.

Reeling in on the pulling line accordingly will apply a tension force to the tree at an elevated position where considerable leverage is applied. This tension force is applied in the direction in which it is desired that the tree will fall, for example uphill as shown in the illustration, or in a direction to avoid rocks, stumps, or downed timber. In this manner the direction of falling of even a very large tree may be controlled with great accuracy.

Having thus described my invention in preferred embodiment, I claim as new and desire to protect by Letters Patent:

1. A directional tree falling aid comprising in combination:
   (a) a logging choker including
      (1) a flexible cable,
      (2) a coupler slidably mounted intermediate the ends of the cable,
      (3) first connecting means on one end of the cable for connecting said one end to the coupler in cable-looping arrangement around a tree to be felled, and
      (4) second connecting means on the other end of the cable for connecting it to a logging pulling line and
   (b) a choker-elevating pole assembly comprising
      (1) a pole adapted to be positioned vertically alongside the tree with its upper end in close proximity to the tree trunk and
      (2) a substantially vertically arranged sheave means fixed to the upper end of the pole and dimensioned to receive the cable in running engagement.

2. The directional tree falling aid of claim 1 wherein the sheave means comprises a U-shaped bracket fixed to the rod as an upward extension thereof, a horizontal shaft mounted across the bracket, and a pulley rotatably mounted on the shaft.

3. The directional tree falling aid of claim 1 including tree trunk-engaging, horizontally-extending spur means fixed to the bracket.

4. The directional tree falling aid of claim 1 including guy line means connected to the upper end of the pole assembly.

5. The directional tree falling aid of claim 1 including a ground-engaging foot on the lower end of the pole.

6. The directional tree falling aid of claim 1 wherein the pole is a segmented pole comprising a plurality of releasably interconnecting segments.

7. The method of applying directional tree falling aid to a tree to be felled which comprises:
   (a) arranging a pilot line over the sheave of a longitudinal pole having a vertically arranged sheave on one end,
   (b) elevating the pole and placing said one end in close proximity to an elevated portion of the tree trunk with the ends of the pilot line trailing near the ground,
   (c) at substantially ground level, connecting one of the trailing ends of the pilot line to a logging choker,
   (d) pulling the pilot line to mount the choker on the sheave with its ends trailing near the ground,
   (e) at substantially ground level, looping the choker line about the tree trunk,
   (f) at substantially ground level connecting the choker line to a logging pulling line, and
   (g) pulling in on the pulling line to tighten the choker and set it about the tree trunk at substantially the elevation of the sheave, preparatory to felling the tree with accompanying tension applied by the pulling line to control the direction of tree falling.

* * * * *